United States Patent
Wang

(10) Patent No.: US 10,800,309 B2
(45) Date of Patent: Oct. 13, 2020

(54) CAR CIGARETTE LIGHTER

(71) Applicant: Shenzhen Jiemeisi Industrial Co., Ltd., Shenzhen (CN)

(72) Inventor: Liming Wang, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 345 days.

(21) Appl. No.: 15/974,709

(22) Filed: May 9, 2018

(65) Prior Publication Data

US 2019/0308541 A1 Oct. 10, 2019

(30) Foreign Application Priority Data

Apr. 4, 2018 (CN) .................. 2018 2 0489241 U

(51) Int. Cl.
*H05B 3/40* (2006.01)
*H05B 3/50* (2006.01)
*B60N 3/14* (2006.01)
*B60R 16/033* (2006.01)

(52) U.S. Cl.
CPC .............. *B60N 3/14* (2013.01); *B60R 16/033* (2013.01)

(58) Field of Classification Search
CPC . H05B 1/0236; H05B 3/0042; H05B 3/40–50
See application file for complete search history.

(56) References Cited

U.S. PATENT DOCUMENTS

| | | | | |
|---|---|---|---|---|
| 8,371,709 | B2* | 2/2013 | Cheng ...................... | B60N 3/14 219/267 |
| 2013/0043230 | A1* | 2/2013 | Schwarzbach ....... | H05B 1/0213 219/202 |
| 2013/0200063 | A1* | 8/2013 | Cooke ................. | A47J 41/0044 219/439 |
| 2014/0123989 | A1* | 5/2014 | LaMothe ................. | H05B 3/06 131/328 |
| 2015/0245659 | A1* | 9/2015 | DePiano ................ | B21D 53/06 392/397 |
| 2015/0313287 | A1* | 11/2015 | Verleur ................. | A24F 47/008 131/329 |
| 2016/0345626 | A1* | 12/2016 | Wong ..................... | H02J 7/0045 |
| 2019/0116880 | A1* | 4/2019 | Lau .......................... | H05B 3/46 |

* cited by examiner

*Primary Examiner* — Michael A Laflame, Jr.

(57) ABSTRACT

A car cigarette lighter includes a housing, a heater covered on the housing, a battery and a printed circuit board (PCB) respectively received in a receiving room formed between the housing and the heater. The battery is electrically connected to the PCB and tightly fixed with the housing. The heater is electrically connected to the PCB and the PCB is tightly fixed in an installing slot of the housing. When the heater starts to heat, the current of the battery is transmitted to the heater via the PCB. The built-in battery of the car cigarette lighter can heat the car's cigarette lighter and realize the cigarette lighting function by consuming the electric energy within the battery when the car cigarette lighter is disconnected from the cigarette lighter interface. The structure is compact and convenient to carry.

20 Claims, 3 Drawing Sheets

CAR CIGARETTE LIGHTER

BACKGROUND

1. Technical Field

The present disclosure generally relates to cigarette lighters field, and especially relates to a car cigarette lighter.

2. Description of Related Art

Nowadays, with the development of the economy, people's living standards are getting higher and higher so that cars have entered thousands of families. A cigarette lighter interface of the car is capable of heating the cigarette lighter so that the cigarette lighter can reach the temperature at which the cigarette is lit. However, a conventional cigarette lighter can only be inserted into a cigarette lighter interface to wait for the temperature of the cigarette lighter arriving a preset temperature and then automatically ejected out of the cigarette lighter interface and then the cigarette can be lit. When the cigarette lighter interface is occupied by other devices, it is not possible to light the electronic cigarette, which is very inconvenient.

SUMMARY

The disclosure relates to a car cigarette lighter which provides a built-in battery thereof so that is may accordingly not only heat the cigarette lighter and realize the cigarette lighting function by using the electric energy within the battery when the car cigarette lighter is disconnected from the cigarette lighter interface, but also the structure is compact and convenient to carry.

In one aspect, a car cigarette lighter includes: a housing, a heater covered on the top end of the housing, the heater and the housing cooperatively forming a receiving room for receiving a battery and a printed circuit board (PCB) therein. The battery is electrically connected to the PCB and tightly fixed with the housing, and the heater is electrically connected to the PCB and the PCB is tightly fixed with an installing slot of the first housing. The heater starts to heat the cigarette when the current of the battery is transmitted to the heater via the PCB.

Wherein the cigarette lighter further includes a switch electrically connected to the PCB, the switch including a push button and a switching PCB tightly fixed with and electrically connected to the PCB. The housing includes a first mounting recess extending along an axial direction of the housing, the push button passing through the first mounting recess and removably connected to the switching PCB, when the switch is activated, the heater heats and ignites the cigarette by consuming electrical power within the battery.

Wherein the heater is disc-shaped structure and includes a heating portion extending downward along an axial direction of the heater and electrically connected to the PCB, the heater is made of heat-resistant material capable of withstanding the heat generated by the heating portion.

Wherein the cigarette lighter further includes a first electrical device symmetrically arranged with a U-shaped configuration and electrically connected to a low portion of the PCB, two opposite ends of the first electrical device contracted inward under the action of external forces.

Wherein the cigarette lighter further includes a second spring-shaped electrical device electrically connected to the bottom of the PCB and contracted inwardly under the action of external forces.

Wherein the housing is generally a stepped-hollow-cylinder structure with an upper end opening thereof and the heater overlying on the upper end of the housing. The housing includes a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the connecting portion and the radial diameter of the connecting portion smaller than that of the first body portion.

Wherein the housing includes a pair of second mounting recesses extending downward along the axial direction of the second body portion and symmetrically arranged thereof, and a third mounting recess arranged on the middle of the bottom of the second body portion, all the pair of second mounting recesses and the third mounting recess passing through the lateral wall of the second body portion.

Wherein the cigarette lighter further includes a pair of first terminals extending along an axial direction of the housing and symmetrically arranged on the lateral wall of the housing to removably connect with the housing, and the pair of first terminals respectively passing through the pair of second mounting recesses and electrically connected to two opposite ends of the first electrical device.

Wherein the cigarette lighter further includes a second terminal extending downward from the bottom of the housing along the axial direction of the housing to removably connect with the housing, the second terminal passing through the third mounting recess and electrically connected to the second electrical device.

Wherein the first electrical device is a conductive metal strip with symmetrical structure, and the second electrical device is a conductive metal spring.

In another aspect, a car cigarette lighter according to an exemplary embodiment of the present disclosure includes a stepped-hollow-cylinder-shaped housing with an upper end opening thereof, a disc-shaped heater covered on the upper end opening of the housing, a battery and a printed circuit board (PCB) respectively received in a receiving room formed between the housing and the heater. The battery is electrically connected to the PCB and the PCB is tightly fixed in an installing slot of the housing. The heater includes a heating portion extending downward along an axial direction of the heater and electrically connected to the top end of the PCB and is made of heat-resistant material capable of withstanding the heat generated by the heating portion. The heater starts to heat the cigarette when the current of the battery is transmitted to the heater via the PCB.

Wherein the housing includes a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the connecting portion and the radial diameter of the connecting portion smaller than that of the first body portion.

Wherein the cigarette lighter further includes a first electrical device symmetrically arranged with a U-shaped configuration and electrically connected to a low portion of the PCB, two opposite ends of the first electrical device contracted inward under the action of external forces, and a second spring-shaped electrical device electrically connected to the bottom of the PCB and contracted inward under the action of external forces.

Wherein the cigarette lighter further includes a switch electrically connected to the PCB. The switch includes a push button and a switching PCB tightly fixed with and electrically connected to the PCB. The housing includes a first mounting recess extending along the axial direction of the housing, the push button passing through the first mounting recess and removably connected to the switching PCB. When the switch is activated, the heater heats and ignites the cigarette by consuming electrical power within the battery. The housing includes a pair of second mounting recesses extending downward along the axial direction of the second body portion and symmetrically arranged thereof, and a third mounting recess arranged on the middle of the bottom of the second body portion, all the pair of second mounting recesses and the third mounting recess passing through the lateral wall of the second body portion.

Wherein the cigarette lighter further includes a pair of first terminals extending along the axial direction of the housing and symmetrically arranged on the lateral wall of the second body portion to removably connect with the second body portion, and a second terminal extending downward from the bottom of the second body portion along the axial direction of the t housing to removably connect with the second body portion, the pair of first terminals respectively passing through the pair of second mounting recesses and electrically connected to two opposite ends of the first electrical device, and the second terminal passing through the third mounting recess and electrically connected to the second electrical device.

Wherein the first electrical device is a conductive metal strip with symmetrical structure, and the second electrical device is a conductive metal spring.

The present disclosure provides the advantages as below.

The built-in battery of the car cigarette lighter can heat the car's cigarette lighter and realize the cigarette lighting function by using the electric energy inside the battery, when the car cigarette lighter is disconnected from the cigarette lighter interface. Furthermore, the structure is compact and convenient to carry.

DETAILED DESCRIPTION

Figure 1:
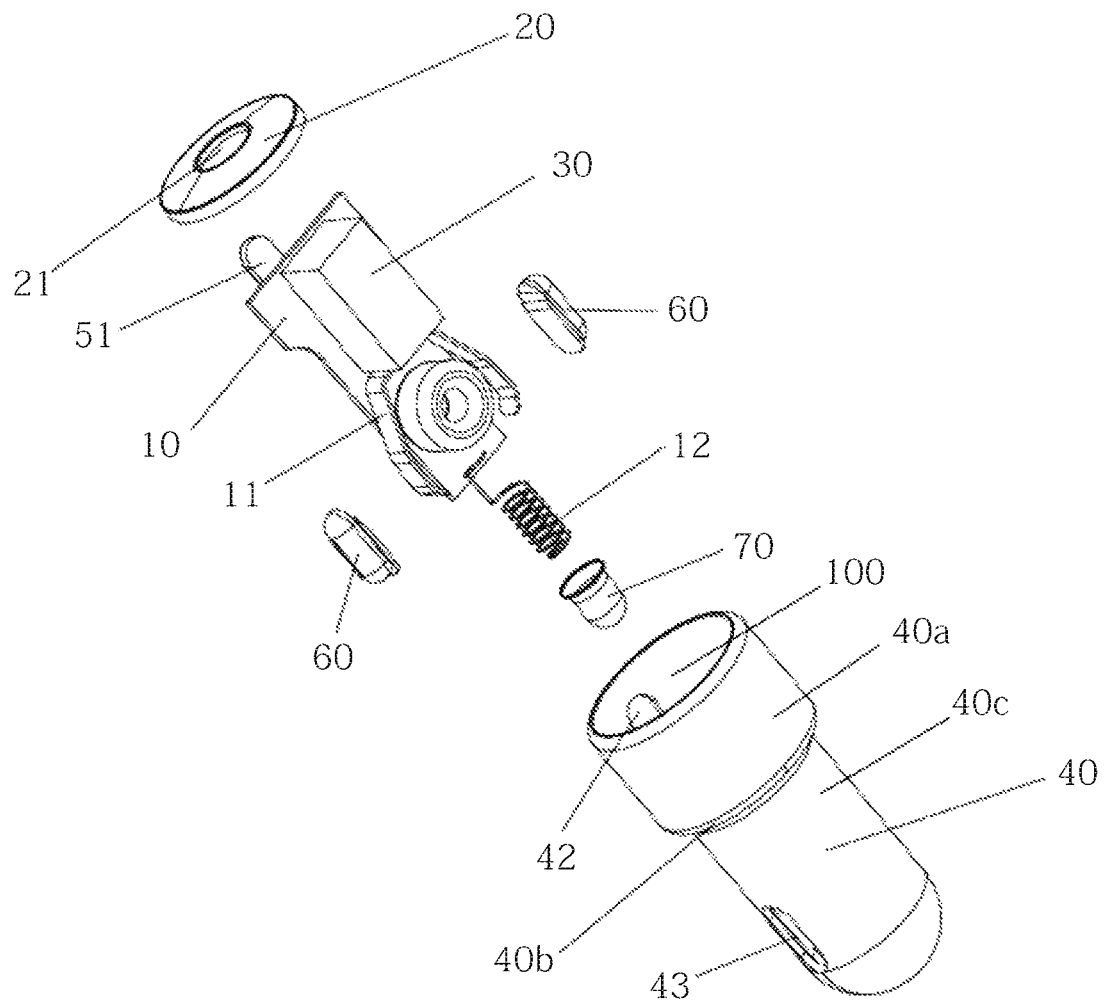
FIG. 1 is an exploded, schematic view of the car cigarette lighter in accordance with an exemplary embodiment.

The disclosure is illustrated by way of example and not by way of limitation in the figures of the accompanying drawings, in which like reference numerals indicate similar elements.

Referring to FIGS. 1-4, the car cigarette lighter according to an exemplary embodiment includes a printed circuit board (PCB) 10, a heater 20, a battery 30 and a housing 40. The heater 20 is electrically connected to the PCB 10 and covered on the top end of the housing 40 so that the heater 20 and the housing 40 are cooperatively formed a receiving room 100 for receiving the battery 30 and the PCB 100 therein. The battery 30 is electrically connected to the PCB 10 and tightly fixed with the housing 40. The PCB 10 is tightly fixed with an installing slot 41 of the housing 40. The heater 20 starts to heat the cigarette when the current of the battery 30 is transmitted to the heater 20 via the PCB 10.

In the exemplary embodiment of the present disclosure, the housing 40 is generally a stepped-hollow-cylinder structure with an upper end opening thereof. The heater 20 is disc-shaped configuration and covered on the upper end of the housing 40. The housing 40 includes a first hollow-cylinder-shaped body portion 40a, a connecting portion 40b connected to the bottom of the first body portion 40a and a second body portion 40c connected to the bottom of the connecting portion 40b. The first body portion 40a, the connecting portion 40b and the second body portion 40c are coaxially formed with each other. The radial diameter of the second body portion 40c is smaller than that of the connecting portion 40b and the radial diameter of the connecting portion 40b is smaller than that of the first body portion 40a.

In the exemplary embodiment of the present disclosure, when the car cigarette lighter is inserted into the cigarette lighter interface to start working, the current is transmitted to charge the battery 30 through the PCB 10. When the battery 30 is fully charged, the cigarette lighter is automatically ejected out of the cigarette lighter interface, the heater 20 is heated to arrive a temperature capable of igniting the cigarette by consuming electronic energy within the battery 30. The present disclosure of the car cigarette lighter can accordingly heat the car's cigarette lighter and realize the cigarette lighting function by consuming electronic energy within the battery when the car cigarette lighter is disconnected from the cigarette lighter interface. Furthermore, the structure is compact and convenient to carry.

Figure 2:
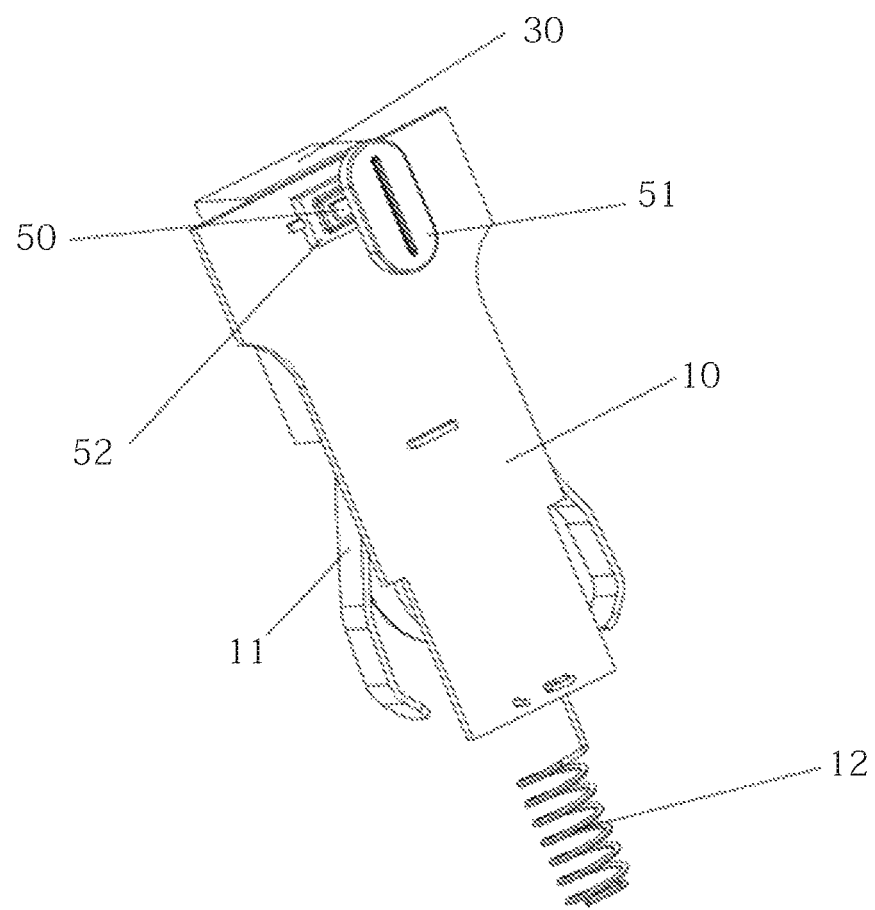
FIG. 2 is a partially schematic view of the car cigarette lighter of FIG. 1, shown the assembly of a PCB, a battery, a first electrical device, a second electrical device and a switch of the car cigarette lighter of FIG. 1 from another view.
Figure 4:
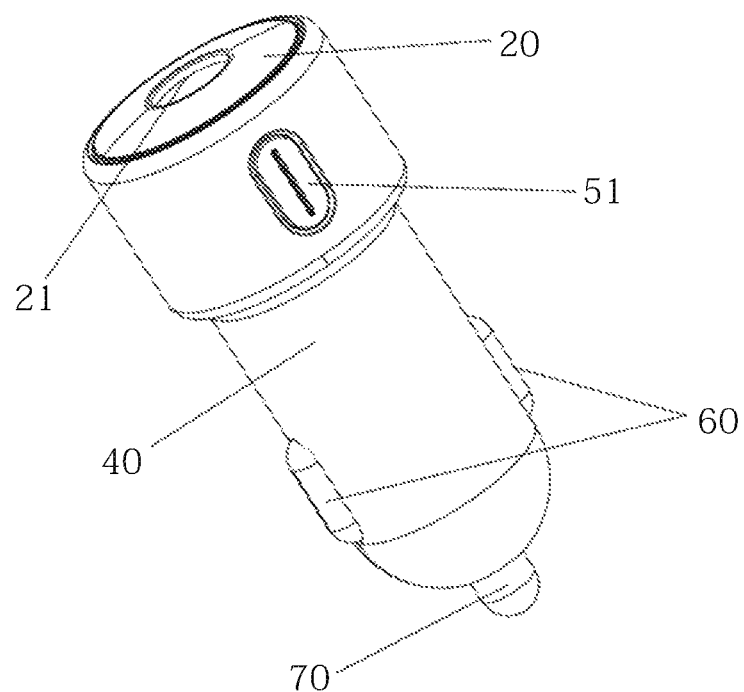
FIG. 4 is a schematic assembly view of the car cigarette lighter of FIG. 1.

Referring to FIG. 1, FIG. 2 and FIG. 4, the cigarette lighter further includes a switch 50 electrically connected to the PCB 10. The switch 50 includes a push button 51 and a switching PCB 52 tightly fixed with and electrically connected to the PCB 10. The first body portion 40a of the housing 40 includes a first mounting recess 42 extending along an axial direction of the housing 40 so that the push button 51 can pass through the first mounting recess 42 to removably connect to the switching PCB 52. When the switch 50 is activated, the heater 20 heats and ignites the cigarette by consuming electrical power within the battery 30.

In the exemplary embodiment of the present disclosure, the switch 50 is a button switch structure and is provided for controlling the heater 20 to heat. When needing to use the cigarette lighter function, the switch 50 is pressed along the direction perpendicular to the housing 40. That is to say, the switch 60 is pressed along the radial direction of the housing 40. At this time, the heater 20 consumes the power within the battery 30 to start heating the cigarette. After the cigarette is ignited, the switch 50 is again pressed to stop the heater 20 heating, and then the car cigarette lighter is inserted back into the cigarette lighter interface. The present disclosure of the care cigarette lighter is provided with overload protection. When the temperature of the heater 20 reaches a preset temperature of the car cigarette lighter, the heater 20 can be automatically stopped heating even if the switch 50 is not pressed again, thereby the user's safety is protected.

Referring to FIG. 1 and FIG. 4, the heater 20 is disc-shaped structure and includes a heating portion 21 extending downward along an axial direction of the heater 20 and electrically connected to the PCB 10. The heater 20 is made of heat-resistant material capable of withstanding the heat generated by the heating portion 21.

In the exemplary embodiment of the present disclosure, the heating portion 21 is a tungsten filament heating body so that it is capable of generating more heat under a lower power consumption to ensure the on-board ability of the cigarette lighter. The heater 20 is made of heat-resistant material, which can ensure that the car cigar lighter is not damaged by heat generated from the heating portion 21.

Referring to FIG. 1 and FIG. 2, the cigarette lighter further includes a pair of first electrical devices 11 symmetrically arranged with a U-shaped configuration and perpendicularly fixed with the PCB 10, and a second spring-shaped electrical device 12 tightly and electrically connected to the bottom of the PCB 10. The pair of first electrical devices 11 is electrically connected to a low portion of the PCB 10. Two opposite ends of the first electrical device 11 are contracted inward under the action of external forces, while the second electrical device 12 is also contracted inward under the action of external forces.

In the exemplary embodiment of the present disclosure, the first electrical device 11 is a conductive metal strip with symmetrical structure, and the second electrical device 12 is a conductive metal spring. The battery 30 is electrically connected to the top end of the PCB 10 and positioned above the pair of first electrical devices 11.

Figure 3:
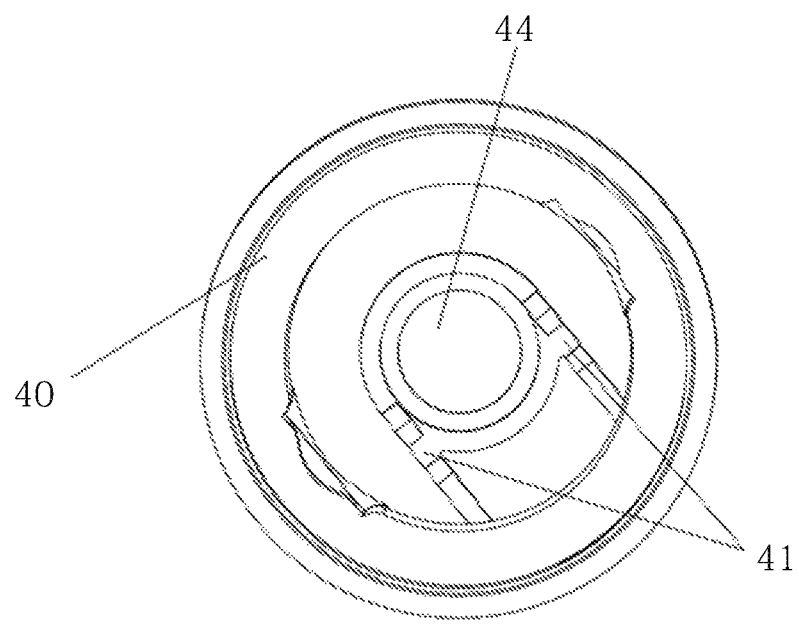
FIG. 3 is a top view of a housing of the car cigarette lighter of FIG. 1.

Referring to FIG. 1 and FIG. 3, the housing 40 includes a pair of second mounting recesses 43 extending downward along the axial direction of the second body portion 40c and symmetrically arranged thereof, and a third mounting recess 43 arranged on the middle of the bottom of the second body portion 40c. The pair of second mounting recesses 42 and the third mounting recess 43 respectively passes through the lateral wall of the second body portion 40c. The cigarette lighter further includes a pair of first terminals 60 extending along the axial direction of the housing 40 and symmetrically arranged on the lateral wall of the second body portion 40c to removably connect with the second body portion 40c, and a second terminal 70 extending downward from the bottom of the second body portion 40c along the axial direction of the housing 40 to removably connect with the second body portion 40c. The pair of first terminals 60 respectively passes through the pair of second mounting recesses 42 and electrically connected to the corresponding ends of the pair of first electrical devices 11. The second terminal 70 passes through the third mounting recess 43 and electrically connected to the second electrical device 12.

In the exemplary embodiment of the present disclosure, the pair of first terminals 60 is respectively past through the corresponding second mounting recesses 42 and electrically connected to the corresponding ends of the pair of first electrical devices 11. The two first terminals 60 are negative and the second terminal 70 is positive. When the car cigarette lighter is inserted into the cigarette lighter interface, the pair of first terminals 60 and the second terminal 70 are compressed and received into the receiving room 100, the current is transmitted from the pair of first terminals 60 and the second terminal 70 to the car cigarette lighter to drive the car cigarette lighter to work.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A car cigarette lighter comprising: a housing, a heater covered on the top end of the housing, the heater and the housing cooperatively forming a receiving room for receiving a battery and a printed circuit board (PCB) therein, the battery electrically connected to the PCB and tightly fixed with the housing, the heater electrically connected to the PCB and the PCB tightly fixed with an installing slot of the first housing; and wherein the heater starts to heat the cigarette when the current of the battery is transmitted to the heater via the PCB; wherein the cigarette lighter further comprises a switch electrically connected to the PCB, the switch comprising a push button and a switching PCB tightly fixed with and electrically connected to the PCB, the housing comprising a first mounting recess extending along an axial direction of the housing, the push button passing through the first mounting recess and removably connected to the switching PCB, when the switch is activated, the heater heats and ignites the cigarette by consuming electrical power within the battery.

2. The car cigarette lighter as claimed in claim 1, wherein the heater is a disc-shaped structure and comprises a heating portion extending downward along an axial direction of the heater and electrically connected to the PCB, the heater is made of heat-resistant material capable of withstanding the heat generated by the heating portion.

3. The car cigarette lighter as claimed in claim 1, wherein the cigarette lighter further comprises a first electrical device symmetrically arranged with a U-shaped configuration and electrically connected to a low portion of the PCB, two opposite ends of the first electrical device contracted inward under the action of external forces.

4. The car cigarette lighter as claimed in claim 3, wherein the cigarette lighter further comprises a second spring-shaped electrical device electrically connected to the bottom of the PCB and contracted inwardly under the action of external forces.

5. The car cigarette lighter as claimed in claim 4, wherein the housing is generally a stepped-hollow-cylinder structure with an upper end opening thereof and comprises a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the connecting portion and the radial diameter of the connecting portion smaller than that of the first body portion.

6. The car cigarette lighter as claimed in claim 5, wherein the housing comprises a pair of second mounting recesses extending downward along the axial direction of the second body portion and symmetrically arranged thereof, and a third mounting recess arranged on the middle of the bottom of the second body portion, all the pair of second mounting recesses and the third mounting recess passing through the lateral wall of the second body portion.

7. The car cigarette lighter as claimed in claim 6, wherein the cigarette lighter further comprises a pair of first terminals extending along the axial direction of the housing and symmetrically arranged on the lateral wall of the second body portion to removably connect with the second body portion, and the pair of first terminals respectively passing through the pair of second mounting recesses and electrically connected to two opposite ends of the first electrical device.

8. The car cigarette lighter as claimed in claim 7, wherein the cigarette lighter further comprises a second terminal extending downward from the bottom of the second body portion along the axial direction of the housing to removably connect with the second body portion, the second terminal passing through the third mounting recess and electrically connected to the second electrical device.

9. The car cigarette lighter as claimed in claim 8, wherein the first electrical device is a conductive metal strip with symmetrical structure, and the second electrical device is a conductive metal spring.

10. A car cigarette lighter comprising:
a stepped-hollow-cylinder-shaped housing with an upper end opening thereof;
a disc-shaped heater covered on the upper end opening of the housing;
a battery and a printed circuit board (PCB) respectively received in a receiving room formed between the housing and the heater, the battery electrically connected to the PCB and the PCB tightly fixed in an installing slot of the housing; and wherein
the heater comprises a heating portion extending downward along an axial direction of the heater and electrically connected to the top end of the PCB and is made of heat-resistant material capable of withstanding the heat generated by the heating portion, the heater starts to heat the cigarette when the current of the battery is transmitted to the heater via the PCB.

11. The car cigarette lighter as claimed in claim 10, wherein the housing comprises a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the connecting portion and the radial diameter of the connecting portion smaller than that of the first body portion.

12. The car cigarette lighter as claimed in claim 11, wherein the cigarette lighter further comprises a first electrical device symmetrically arranged with a U-shaped configuration and electrically connected to a low portion of the PCB, two opposite ends of the first electrical device contracted inward under the action of external forces, and a second spring-shaped electrical device electrically connected to the bottom of the PCB and contracted inward under the action of external forces.

13. The car cigarette lighter as claimed in claim 12, wherein the cigarette lighter further comprises a switch electrically connected to the PCB, the switch comprising a push button and a switching PCB tightly fixed with and electrically connected to the PCB, the housing comprising a first mounting recess extending along the axial direction of the housing, the push button passing through the first mounting recess and removably connected to the switching PCB; when the switch is activated, the heater heats and ignites the cigarette by consuming electrical power within the battery; the housing comprising a pair of second mounting recesses extending downward along the axial direction of the second body portion and symmetrically arranged thereof, and a third mounting recess arranged on the middle of the bottom of the second body portion, all the pair of second mounting recesses and the third mounting recess passing through the lateral wall of the second body portion.

14. The car cigarette lighter as claimed in claim 13, wherein the cigarette lighter further comprises a pair of first terminals extending along the axial direction of the housing and symmetrically arranged on the lateral wall of the second body portion to removably connect with the second body portion, and a second terminal extending downward from the bottom of the second body portion along the axial direction of the housing to removably connect with the second body portion, the pair of first terminals respectively passing through the pair of second mounting recesses and electrically connected to two opposite ends of the first electrical device, and the second terminal passing through the third mounting recess and electrically connected to the second electrical device.

15. The car cigarette lighter as claimed in claim 14, wherein the first electrical device is a conductive metal strip with symmetrical structure, and the second electrical device is a conductive metal spring.

16. A car cigarette lighter comprising:
a housing;
a heater covered on a top end of the housing, the heater and the housing being enclosed to form a receiving room;
a printed circuit board (PCB) received in the receiving room and connected to the housing, the heater being electrically connected to the PCB;
a battery received in the receiving room and disposed at an upper portion of the PCB, the battery being electrically connected to the PCB;
a first electrical device disposed at a lower portion of the PCB and electrically connected to the PCB, two opposite ends of the first electrical device contracted inward under the action of external forces; and
a second electrical device disposed at a bottom of the PCB and electrically connected to the PCB.

17. The car cigarette lighter as claimed in claim 16, wherein the cigarette lighter further comprises a switch electrically connected to the PCB, the switch comprising a push button and a switching PCB tightly fixed with and electrically connected to the PCB, the housing comprising a first mounting recess extending along an axial direction of the housing, the push button passing through the first mounting recess and removably connected to the switching PCB, when the switch is activated, the heater heats and ignites the cigarette by consuming electrical power within the battery.

18. The car cigarette lighter as claimed in claim 16, wherein the heater comprises a heating portion extending downward along an axial direction of the heater and electrically connected to the top end of the PCB and is made of heat-resistant material capable of withstanding the heat generated by the heating portion, the heater starts to heat the cigarette when the current of the battery is transmitted to the heater via the PCB.

19. The car cigarette lighter as claimed in claim 16, wherein the housing comprises a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the connecting portion and the radial diameter of the connecting portion smaller than that of the first body portion.

20. The car cigarette lighter as claimed in claim 19, wherein the housing comprises a pair of second mounting recesses extending downward along the axial direction of the second body portion and symmetrically arranged thereof, and a third mounting recess arranged on the middle of the bottom of the second body portion, all the pair of second mounting recesses and the third mounting recess passing through the lateral wall of the second body portion.

* * * * *